(12) United States Patent
Wong et al.

(10) Patent No.: US 8,155,180 B2
(45) Date of Patent: *Apr. 10, 2012

(54) ADAPTIVE EQUALIZATION METHODS AND APPARATUS

(75) Inventors: Wilson Wong, San Francisco, CA (US); Sergey Shumarayev, San Leandro, CA (US); Rakesh Patel, Cupertino, CA (US)

(73) Assignee: Altera Corporation, San Jose, CA (US)

( * ) Notice: Subject to any disclaimer, the term of this patent is extended or adjusted under 35 U.S.C. 154(b) by 583 days.

This patent is subject to a terminal disclaimer.

(21) Appl. No.: 12/358,459

(22) Filed: Jan. 23, 2009

(65) Prior Publication Data

US 2009/0141787 A1 Jun. 4, 2009

Related U.S. Application Data

(63) Continuation of application No. 10/853,987, filed on May 25, 2004, now Pat. No. 7,492,816.

(51) Int. Cl.
*H03H 7/30* (2006.01)

(52) U.S. Cl. ...... 375/232; 375/228; 375/345; 375/219; 375/220; 375/213; 375/233; 375/284; 375/278; 375/296

(58) Field of Classification Search ............ 375/232, 375/228, 345, 219, 220, 213, 233, 284, 296
See application file for complete search history.

(56) References Cited

U.S. PATENT DOCUMENTS

| | | | |
|---|---|---|---|
| 3,988,678 A | * | 10/1976 | Hodge ............... 455/67.16 |
| 5,343,236 A | | 8/1994 | Koppe et al. |
| 6,603,810 B1 | | 8/2003 | Bednekoff et al. |
| 6,650,140 B2 | | 11/2003 | Lee et al. |
| 6,870,404 B1 | | 3/2005 | Maangat |
| 6,940,302 B1 | | 9/2005 | Shumarayev et al. |
| 6,956,407 B2 | | 10/2005 | Baig et al. |
| 6,956,896 B2 | * | 10/2005 | Johnson ............... 375/224 |
| 7,047,457 B1 | | 5/2006 | Black et al. |
| 7,196,557 B1 | | 3/2007 | Kwasniewski et al. |
| 7,239,849 B2 | | 7/2007 | Bereza et al. |
| 2002/0123851 A1 | | 9/2002 | Kurooka et al. |
| 2005/0160327 A1 | | 7/2005 | Baig et al. |
| 2006/0098727 A1 | | 5/2006 | Kuijk |
| 2006/0140262 A1 | | 6/2006 | Kuijk et al. |

* cited by examiner

*Primary Examiner* — Kabir A Timory
(74) *Attorney, Agent, or Firm* — Ropes & Gray LLP

(57) ABSTRACT

A system includes a programmable transmitter device (e.g., a PLD) connected to a programmable receiver device (e.g., another PLD) via a transmission medium for transmitting a high-speed data signal from the transmitter to the receiver. During a test mode of operation a low-speed communication link between the transmitter and receiver allows those devices to work together to transmit test signals having known characteristics from the transmitter to the receiver via the transmission medium, to analyze the test signals as received by the receiver, and to adjust at least some aspect of the system (e.g., equalizer circuitry in the receiver) to at least partly compensate for losses in the test signals as received by the receiver.

13 Claims, 11 Drawing Sheets $$|s21(f)| \leq -20\ln(a1 \cdot f^{0.5} + a2 \cdot f + a3 \cdot f^2)$$

ADAPTIVE EQUALIZATION METHODS AND APPARATUS

CROSS-REFERENCE TO RELATED APPLICATION

This application is a continuation of U.S. patent application No. 10/853,987, filed May 25, 2004 which is hereby incorporated by reference herein in its entirety.

BACKGROUND OF THE INVENTION

This invention relates to digital data communication, and more particularly to methods and apparatus for automatically adjusting the circuitry involved in such communication to compensate for losses in a digital data signal transmitted from transmitter circuitry to receiver circuitry.

Different signal transmission media tend to have different signal transmission characteristics. For example, a cable may have a different transmission characteristic than a printed circuit board backplane. In addition, each instance of any given type of transmission medium may have somewhat different characteristics, within a range that is typical for that type of transmission medium. It is also possible for a transmission medium to change over time or as a result of other environmental factors.

Among the characteristics that can adversely affect the performance of a transmission medium are attenuation and phase shift. It is common for the amount of attenuation and phase shift to be frequency-dependent. Typically, both attenuation and phase shift tend to increase with increasing frequency. For convenience herein, attenuation, phase shift, and other forms of signal degradation are sometimes referred to generically as "losses."

In order to have satisfactory transmission of a digital data signal, especially at high data rates or high frequencies, it may be necessary to compensate for losses in the signal being transmitted. Moreover, because such losses can vary from instance to instance and from time to time, it can be desirable for such compensation to be at least partly automatic or adaptive. A term that is often used for such compensation is equalization. The term pre-emphasis is also sometimes used for compensation or equalization that is performed at the transmitter, i.e., anticipating losses that will occur and compensating for them by modifying the signal before it is transmitted. When the term pre-emphasis is used, equalization may then be used as the term for compensation performed at the receiver. The present inventors tend to prefer equalization performed at the receiver, but aspects of this invention may also be applied to equalization (pre-emphasis) performed at the transmitter.

Programmable circuitry such as programmable logic device ("PLD") circuitry has capabilities that can be useful in supporting adaptive equalization. For example, a PLD or PLD circuitry may be one of the components involved in transmitting or receiving a signal needing adaptive equalization, or such circuitry may be used for controlling certain aspects of the circuitry that transmits and/or receives such a signal. Such programmable circuitry (e.g., PLD circuitry) can be especially useful in implementations of this invention because programmability aids in providing different parameters and/or procedures for addressing different transmission loss characteristics that may be encountered.

SUMMARY OF THE INVENTION

A system in accordance with the invention typically includes a programmable transmitter device (e.g., a PLD) connected to a programmable receiver device (e.g., another PLD) via a transmission medium (e.g., a printed circuit board backplane or a cable) for transmitting a high-speed data signal from the transmitter to the receiver. A low-speed communication link is also provided between the transmitter and the receiver. During a test mode of operation, the transmitter and receiver communicate with one another via the low-speed link to cause the transmitter to transmit test signals having known characteristics via the high-speed transmission medium. For example, these test signals may have known amplitude and successively different frequencies. The receiver analyzes the test signals as received. For example, the receiver may subject each test signal (having a particular frequency) to a series of different amplitude tests (using a series of different amplitude threshold levels) to determine the approximate amplitude of each test signal frequency as received by the receiver. The resulting amplitude vs. frequency information can be used in any of several ways to determine what steps should be taken to at least partly compensate for any signal losses that have been detected. For example, an approximate transfer function can be deduced from this amplitude vs. frequency information. That transfer function (and/or the amplitude vs. frequency information itself) can be used to calculate one or more compensation-control parameters that, when used in the transmitter and/or receiver circuitry, should allow the system to at least partly compensate for losses of the kind that have been detected. As another example, the amplitude vs. frequency information may be compared to several reference sets of such information to find the most nearly matching reference set. One or more compensation-control parameters stored in association with the most nearly matching reference set are retrieved to control the provision of compensation for losses of the kind detected. However they are determined, use of the compensation-control parameter(s) preferably includes at least control of one or more aspects of equalizer circuit components of the receiver. It may also include control of one or more aspects of the transmitter (e.g., pre-emphasis capability of the transmitter).

After initial compensation measures have been taken, the effectiveness of those measures may be determined by transmitting further test signals via the high-speed transmission medium. These further test signals may include any or all of (1) more test signals like those used initially and described above, (2) a data signal having a known data eye width, and/or (3) a known data signal. Further test signals (1) above can be subjected to analysis similar to at least a portion of the analysis described earlier. Further test signals (2) above can be subjected to a received data eye width measurement. Further test signals (3) above can be subjected to a bit error rate ("BER") analysis. If any of these further tests indicate that the compensation measures already taken are not appropriately effective, compensation can be further adjusted.

Further features of the invention, its nature and various advantages, will be more apparent from the accompanying drawings and the following detailed description.

DETAILED DESCRIPTION

Figure 1:
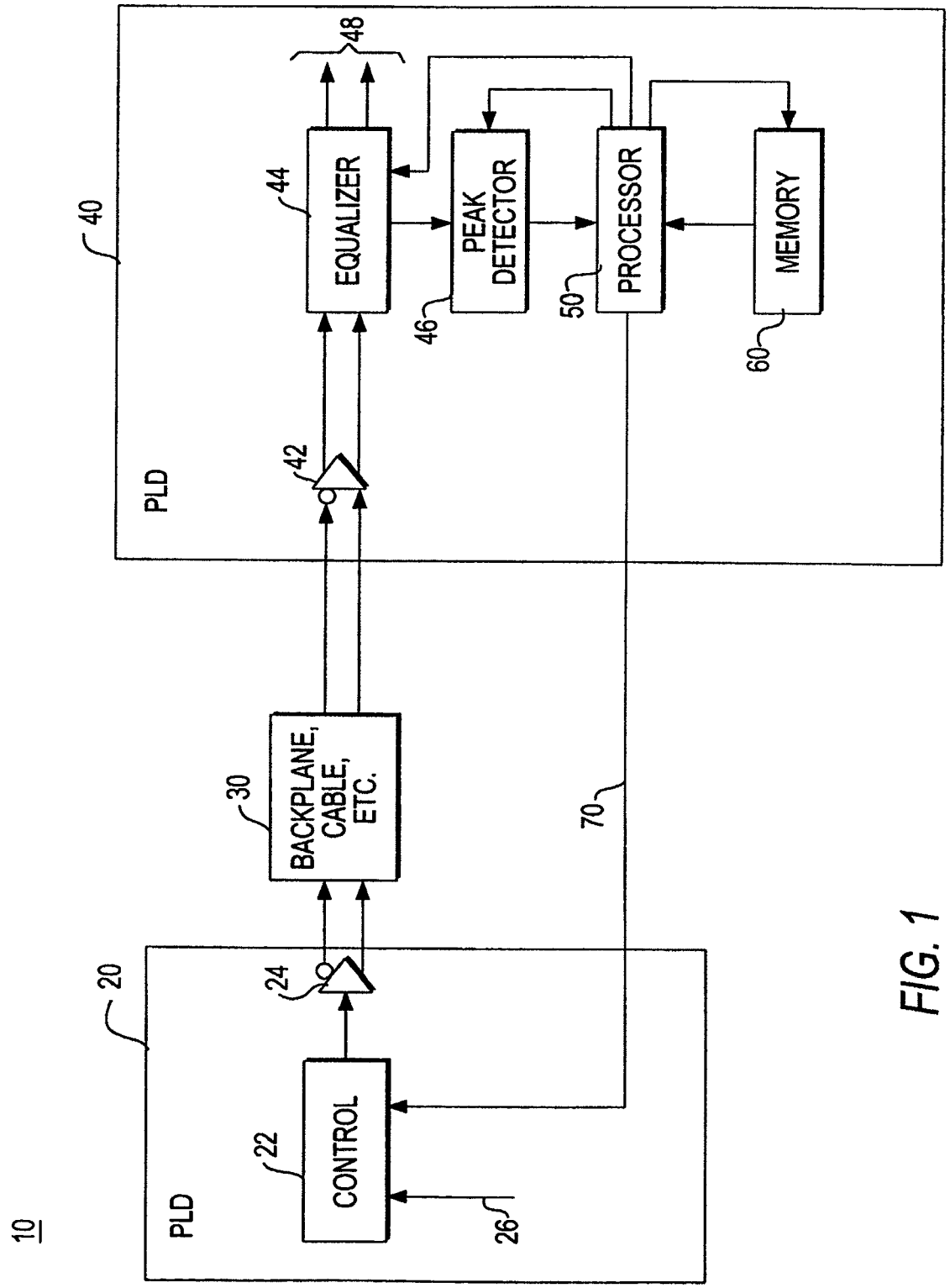
FIG. 1 is a simplified, schematic block diagram of an illustrative system that can be constructed and operated in accordance with the invention.

An illustrative system 10 that can be constructed in accordance with the invention is shown in FIG. 1. System 10 includes two PLDs 20 and 40. Although the term "PLD" is used for devices 20 and 40, it will be understood that these devices can be any of various device types having the capabilities needed to implement this invention. The required capabilities of devices 20 and 40 will become fully apparent as this specification proceeds. Although devices 20 and 40 thus need to have the capabilities needed to implement this invention, they may also have other capabilities needed to perform other functions. Also, although device 20 is shown primarily as a data transmitter in FIG. 1, and although device 40 is shown primarily as a data receiver in the FIG., it will be understood that each of these devices may also include the capabilities depicted for the other, so that either or both may act as both a transmitter and a receiver. Any such transmitter/receiver may exchange data bi-directionally with another transmitter/receiver. Or the transmitter portion may transmit data to one other device and receive data from a second other device.

System 10 also includes a transmission medium 30 by which data is transmitted from device 20 to device 40. Transmission medium 30 is shown in FIG. 1 as a backplane, cable, or other similar communication medium. Devices 20 and 40 may be manufactured without full knowledge of or control over the transmission characteristics of medium 30. Medium 30 may also be subject to some variation in transmission characteristics (e.g., due manufacturing process variation, age, or environmental changes). Devices 20 and 40 are therefore provided, in accordance with this invention, with the ability to automatically (or substantially automatically) modify aspects of their own performance (or at least aspects of the performance of one of devices 20 or 40) to compensate for possible deficiencies or inefficiencies of medium 30 in transmitting data.

Device 20 is shown in FIG. 1 as including control element 22 and differential output driver 24. Control element 22 includes the ability to output a data signal having a variety of characteristics. For example, in order to effectively synthesize a signal having any of a wide range of frequencies, control element 22 may be able to output a data signal having any number of data 1 bits alternating with any number of data 0 bits. (For convenience herein it will be assumed that a data 1 bit is represented by a relatively high voltage level, and that a data 0 bit is represented by a relatively low voltage level. But this convention can be reversed if desired.) A data signal having alternating 1s and 0s has the highest possible frequency; a data signal having two is alternating with two 0s has half the highest frequency; a data signal having three 1s alternating with three 0s has one-third the highest frequency; and so on. Other examples of data signals that control element 22 may be able to output include (1) predetermined test data sequences and (2) actual data (e.g., from some other source 26 on device 20). Control element 22 may also be able to vary the output voltage ("Vod") of the data signal output by device 20. Still another possible capability of control element 22 may be the ability to give the data output signal "pre-emphasis," especially a controllable amount of pre-emphasis. Pre-emphasis is some extra energy (e.g., some extra voltage change) immediately adjacent to (but following) each transition in the level of the data signal. The respect(s) in which element 22 may control pre-emphasis may include (1) the amount of extra voltage change given the data signal adjacently following each transition in that signal, (2) the duration of that extra voltage change, (3) the shape of the extra voltage change, and/or (4) de-emphasizing non-transitioning bits in the data signal. (Although controlling voltage is referred to primarily herein in connection with pre-emphasis, it will be understood that controlling energy or current are among the possible alternatives.)

Output driver 24 converts a single-ended data signal output by control element 22 to a pair of differential output signals applied to transmission medium 30. Although differential data signalling between devices 20 and 40 is shown in FIG. 1, this is only an example, and single-ended (i.e., non-differential) signalling could be used instead if desired. Another point that should be mentioned here is that although FIG. 1 shows elements 22 and 24 as separate from one another, element 24 may be wholly or partly integrated into element 22, and some of the control described above in connection with element 22 may be effected using components of element 24.

Device 40 is shown in FIG. 1 as including differential input driver 42, equalizer circuitry 44, peak detector circuitry 46, processor circuitry 50, and memory circuitry 60.

Input driver 42 applies the differential data signal received from device 20 via transmission medium 30 to equalizer 44. Equalizer 44 is controllable by processor 50 to give the output signals of driver 42 a controllable amount of extra energy (e.g., extra voltage change) immediately adjacent to (but following) each transition in the data signal output by driver 42 and/or to perform any other signal conditioning that is covered by the general term equalization. For example (and as in the case of pre-emphasis), equalizer 44 may control such aspects as the amount, duration, and/or shape of the extra energy imparted after each data signal transition. Also as in the case of pre-emphasis, voltage control is primarily referred to herein in connection with equalization. But energy or current control are possible alternatives. Although elements 42 and 44 are shown as separate in FIG. 1, it will be understood that they may be wholly or partly combined, so that some of the control described above in connection with equalizer 44 may be performed by components of input driver 42.

Figure 8:
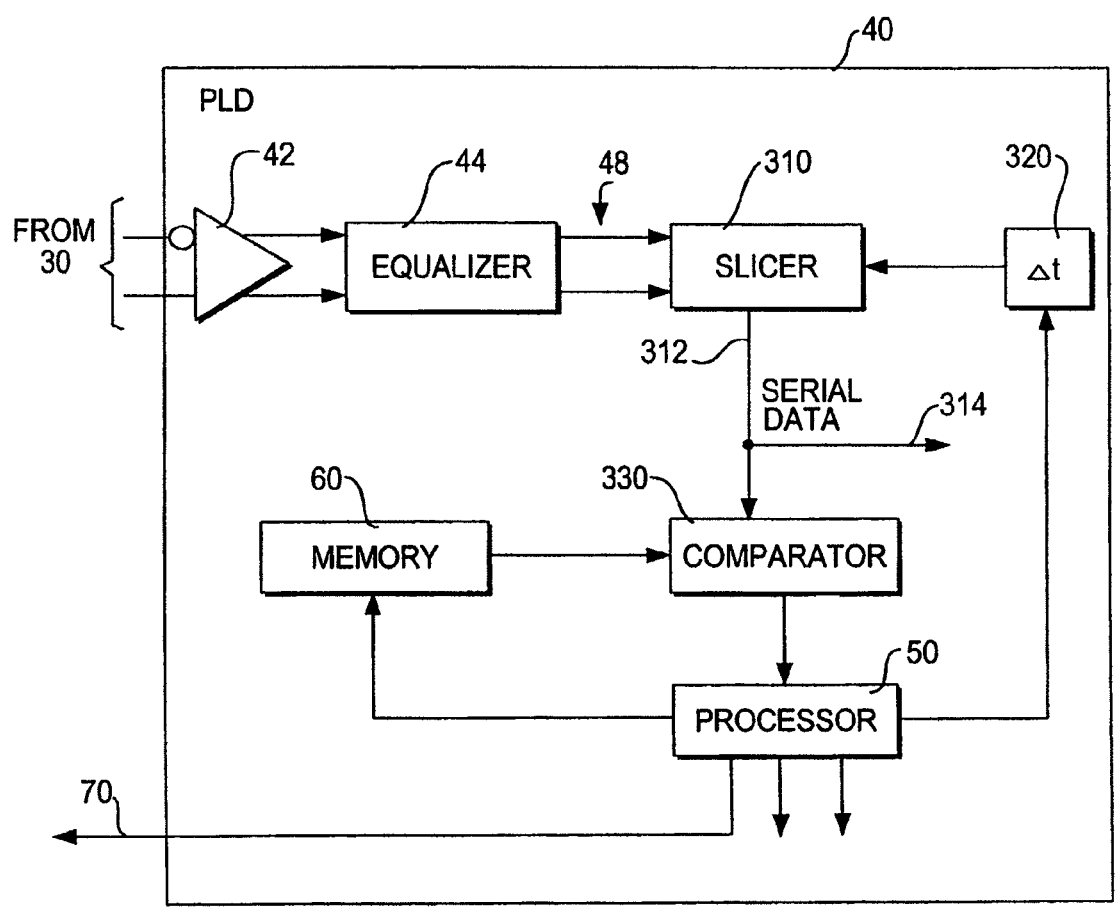
FIG. 8 is similar to a portion of FIG. 1, with possible additional illustrative components in accordance with the invention.

An amplitude-indicating output signal of equalizer 44 is applied to peak detector 46. (Other output signals 48 of equalizer 44 are applied to other circuitry (e.g., as in FIG. 8) for recovery from those signals of the received data. In FIG. 8, for example, the recovered data signal is on line 312, which may include a connection 314 for routing that signal to the programmable logic and/or other circuitry of PLD 40.) Peak detector 46 is essentially an analog-to-digital converter which treats the output signal of equalizer 44 that it receives like an analog signal that needs to be converted to a digital signal based on whether the level of the equalizer output signal is above or below a threshold level ("Vid"). The threshold level used by peak detector 46 may be variable and controlled by processor 50.

The output signal of peak detector 46 is applied to processor 50. In addition to making use of the output signal of peak detector 46, processor 50 may make use of information it retrieves from memory 60. Processor 50 can send signals to device 20 via communication link 70 for controlling or partly controlling operation of control element 22. Communication link 70 can be a relatively low-speed link for which signal attenuation (typically greater at higher frequencies) is not a problem.

Figures 2, 3:
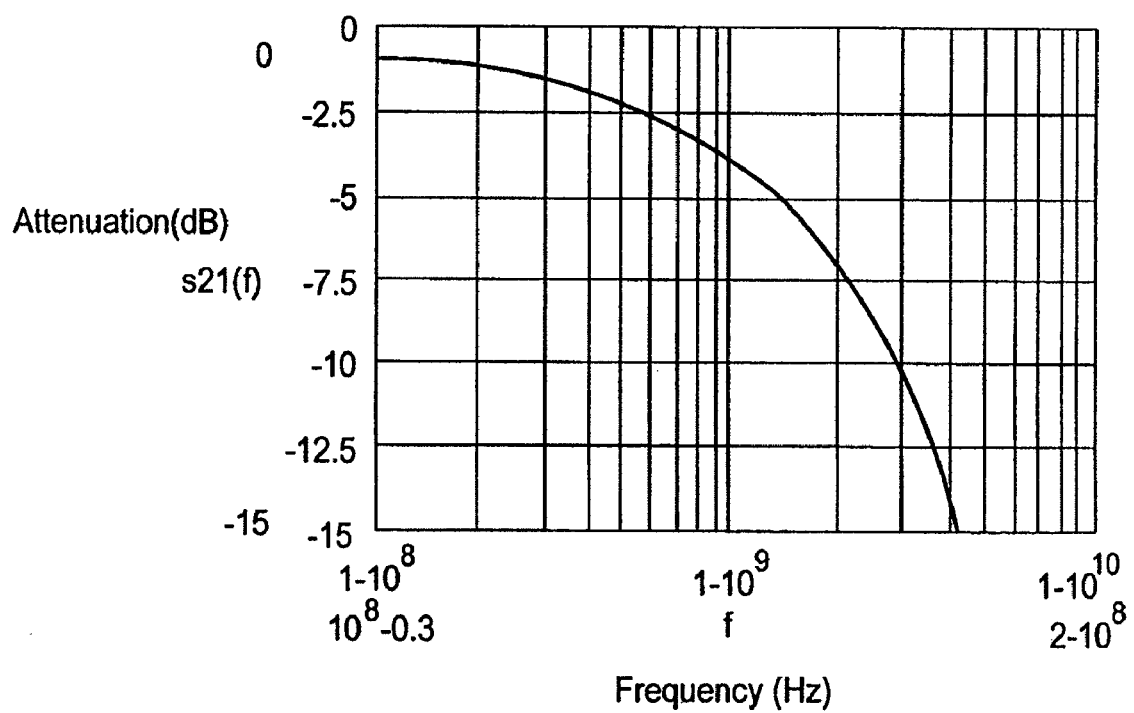
FIG. 2 shows an equation that is useful in explaining certain aspects of the invention.
FIG. 3 is an illustrative transfer function graph that is useful in explaining certain aspects of the invention.

A typical, generalized transmission characteristic ("transfer function") of transmission medium 30 may be given by the equation shown in FIG. 2. In this equation "S21" is the ratio of energy out of medium 30 to energy into that medium, "f" is frequency, and "a1-a31" are coefficients that can vary from system to system, and even from time to time for any given system based on such factors as system age and/or environmental conditions. A typical, generalized graph of the transfer function of FIG. 2 is shown in FIG. 3. (The horizontal axis is FIG. 3 is labelled with two different frequency ranges illustrating two different possible examples. Many other examples are also possible.) It will be understood that FIG. 3 is only illustrative, and that a curve like that shown in FIG. 3 can be shifted left or right, can have steeper or shallower drop-off, etc., depending on the parameters a1-a3 of any particular system. It will also be understood that the generalized characteristics represented by FIGS. 2 and 3 are only examples, and that a system may be governed by a different type of transfer function, which when graphed produces a curve having a different type of shape than the curve shown in FIG. 3. A very common characteristic of transmission media like medium 30, however, is that they behave like a low pass filter to a first order of approximation. This means that low frequency signal components pass with little or no attenuation, while higher frequency signal components experience more attenuation. The present invention allows system 10 to compensate for whatever losses transmission medium 30 is imposing on the data signal being transmitted from device 20 to device 40.

Figure 4A:
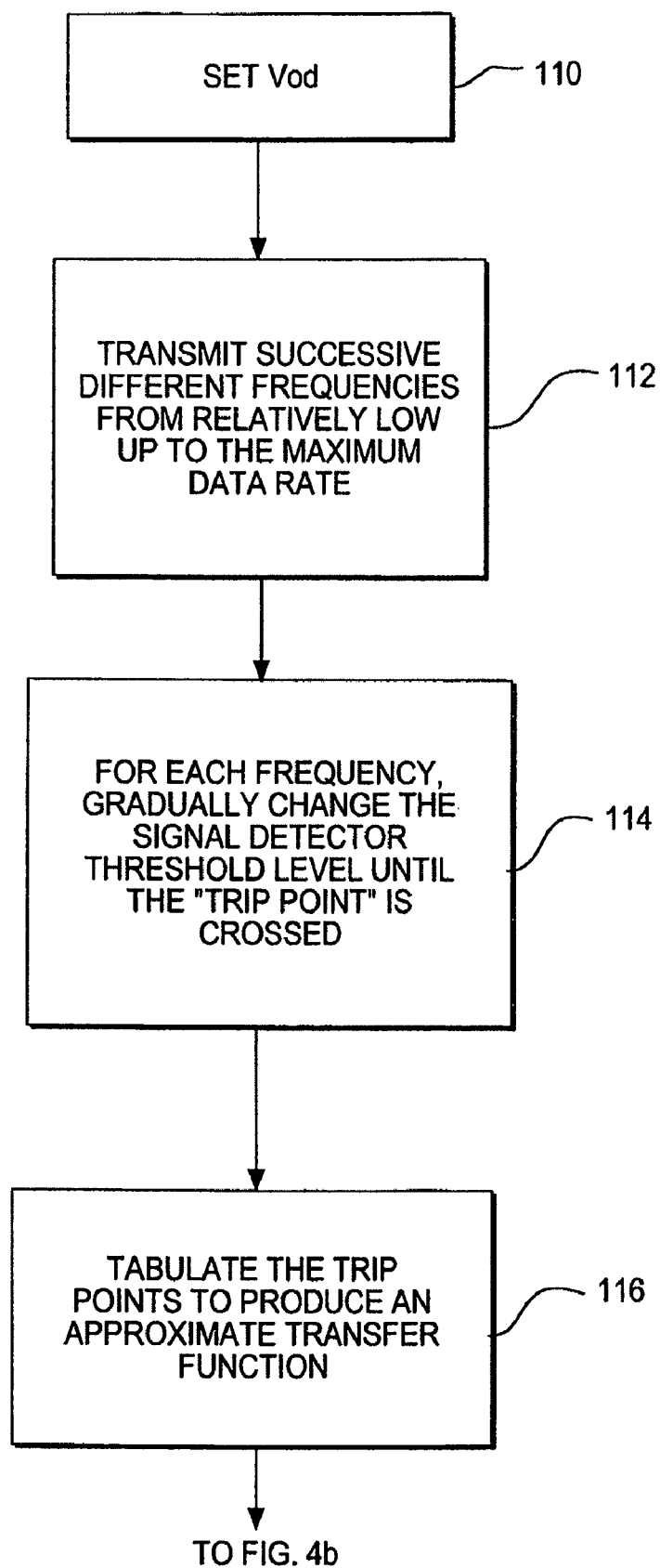
FIGS. 4a and 4b are collectively a simplified flow chart of illustrative operations in accordance with the invention.
Figure 4B:
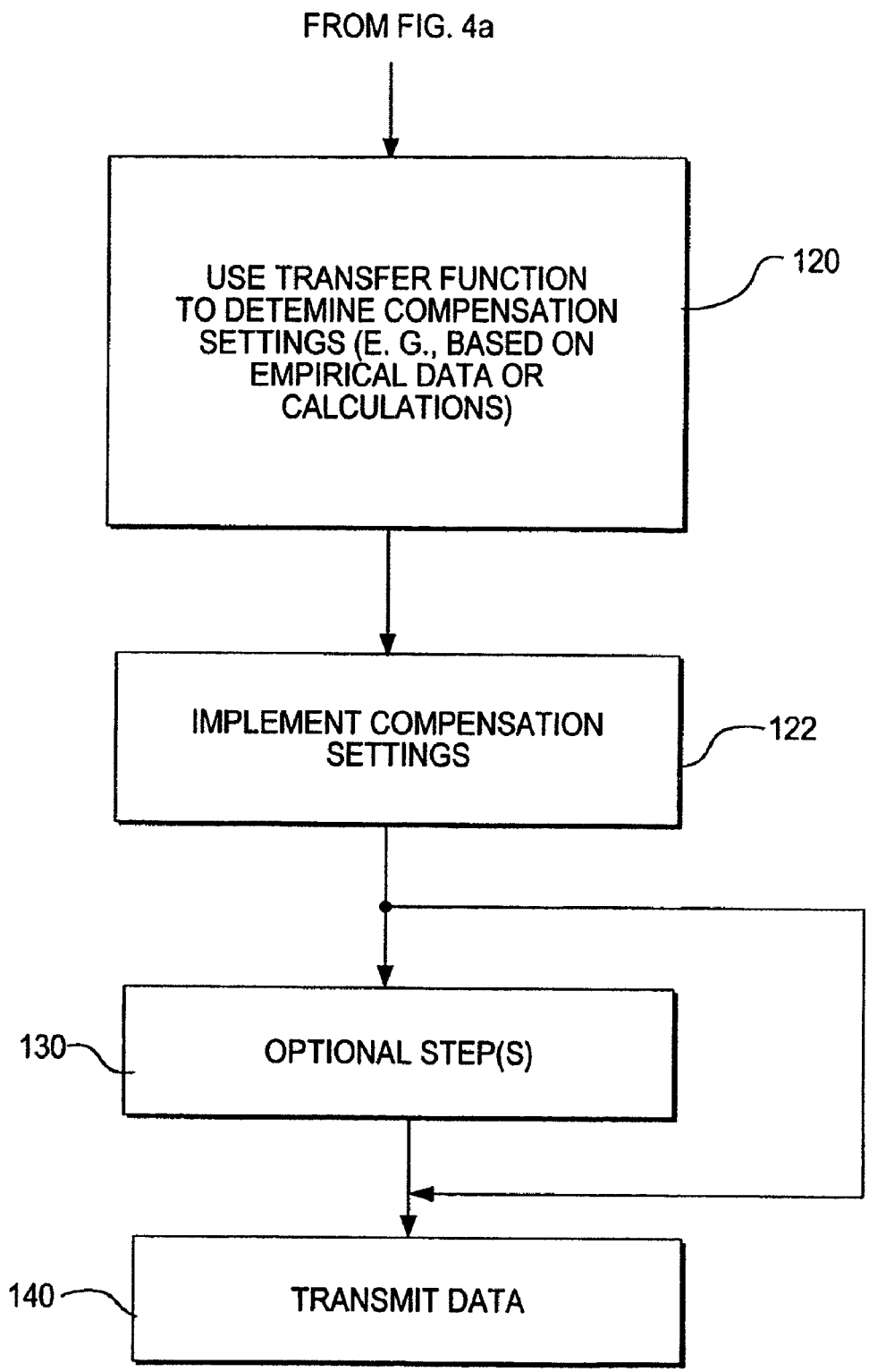

In order to determine and implement the appropriate compensation for transmission losses, system 10 may be operated as shown in FIGS. 4a and 4b. In step 110 processor 50 (FIG. 1) sets the value of Vod used by control element 22. For example, processor 50 may cause element 22 to use a Vod of 900 mV.

In step 112 processor 50 causes control 22 to output a succession of test signals that simulate waveforms having different frequencies. This can be done by having control 22 output a data signal having different numbers of alternating 1s and 0s. The table below shows examples of this for an illustrative system having a maximum data rate of 3.2 Gbps (gigabits per second).

| Number of Repeating 1s and 0s | Simulated Frequency (MHz) |
|---|---|
| 1 (i.e., 101010 . . . ) | 1600 |
| 2 (i.e., 11001100 . . . ) | 800 |
| 3 | 533.333 . . . |
| 4 | 400 |
| 5 | 320 |
| 6 | 266.666 . . . |
| 7 | 228.571 . . . |
| 8 | 200 |

-continued

| Number of Repeating 1s and 0s | Simulated Frequency (MHz) |
|---|---|
| 9 | 177.777 . . . |
| 10 | 160 |
| 20 | 80 |
| 30 | 53.333 . . . |
| 40 | 40 |
| 50 | 32 |

Each simulated frequency is transmitted long enough to permit step 116 to be performed for that frequency. Then a different frequency is transmitted. Collectively the different frequencies used span at least a significant portion of the frequency spectrum in which actual data to be transmitted will lie.

In step 114, during the transmission of each simulated frequency, processor 50 causes the threshold level used by peak detector 46 to change until it is possible to discriminate between a threshold that is just below the high (peak) voltage in the signal output by equalizer 44 and a threshold that is just above that high (peak) voltage.

Figure 5:
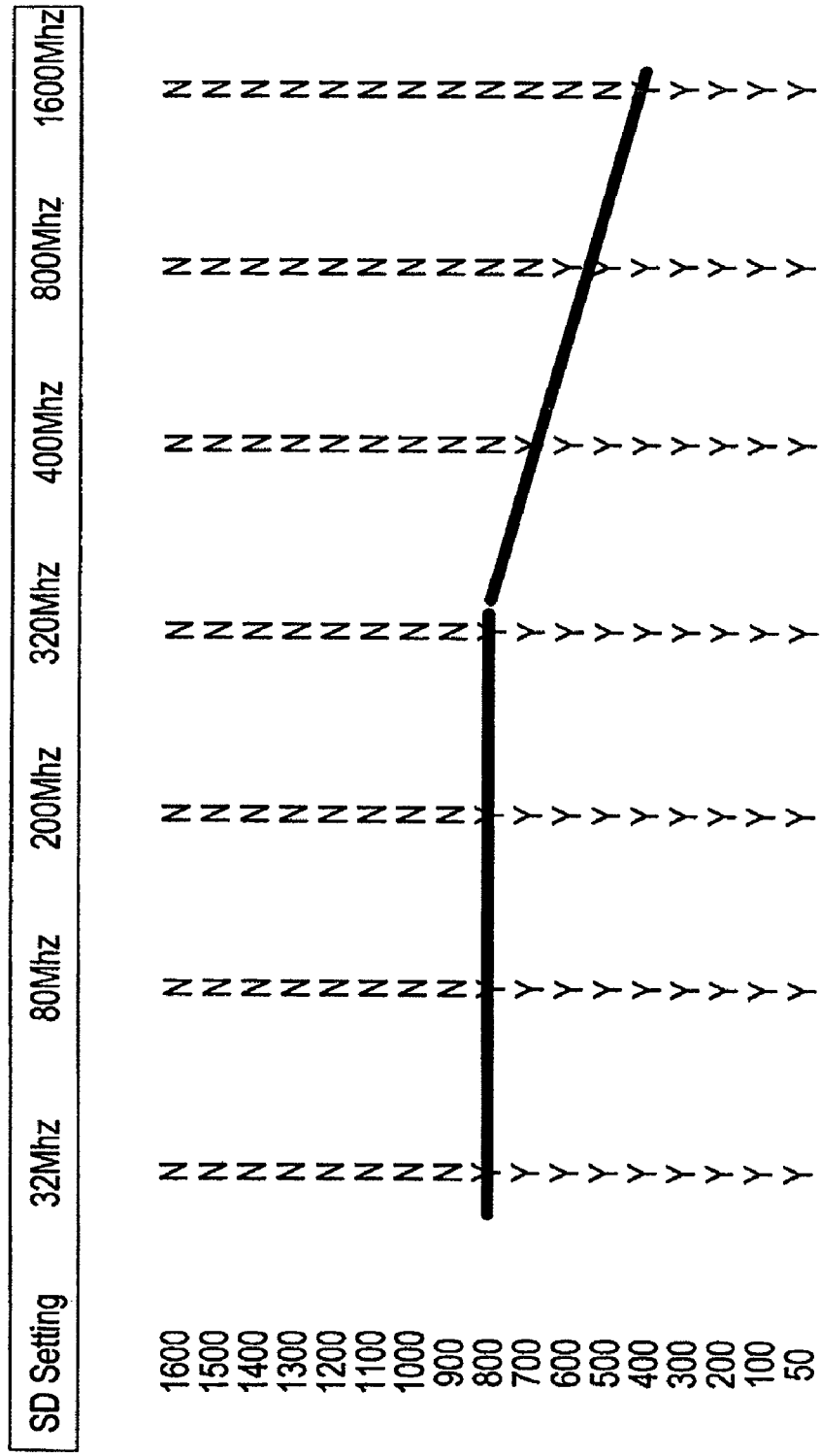
FIG. 5 is a table showing illustrative information about system performance that may be collected and tabulated in accordance with the invention.

In step 116 the results of step 114 are tabulated, e.g., as shown in FIG. 5. Processor 50 may perform this tabulation, possibly using memory 60 to store the results. In FIG. 5 a Y (for yes) entry means that the peak voltage output by equalizer 44 is greater than the threshold voltage setting shown at the horizontally aligned point in the left-most column in the FIG. In FIG. 5 an N (for no) entry means that the peak voltage output by equalizer 44 is not as high as the threshold voltage setting shown at the horizontally aligned point in the left-most column. Thus the values in the left-most column in FIG. 5 are illustrative of the different threshold voltage settings peak detector 46 can be controlled to employ during the output of each different frequency by control 22. In the particular example shown in FIG. 5 the frequencies output by control 22 are 32 MHz, 80 MHz, 200 MHz, 320 MHz, 400 MHz, 800 MHz, and 1600 MHz. (It may not be necessary to try every possible threshold value shown in the left-hand column in FIG. 5. For example, assuming that progressively greater threshold values are employed during the transmission of each frequency, once one or two threshold values have been reached that produce an N result, it can probably be safely assumed that all higher threshold values will also produce N results without taking the time to actually try those higher threshold values.) The line plotted through the highest Y values in the various columns in FIG. 5 is somewhat similar to the theoretical curve shown in FIG. 3. For example, both FIG. 3 and FIG. 5 show transfer functions that are down about 6 dB at 1.6 GHz. In particular, in the case of FIG. 5 the receiver sees about 800 mV of Vid at low frequencies (e.g., 32 MHz). But at 1.6 GHz the receiver sees about 400 mV of Vid. This is an attenuation factor of about −6 dB.

Once a transfer function characteristic has been determined as in step 116, step 120 (FIG. 4b) is performed to determine compensation settings that are appropriate for counteracting the attenuation characteristic that has been found. (For the moment it will be assumed that the compensation settings determined in step 120 are the final compensation settings. Later it will be explained that the step 120 settings may be only initial settings, with additional optional steps 130 being subsequently employed to possibly refine the initial settings.)

Step 120 may be performed based on either empirical data or calculations. In either case, processor 50 may perform the analysis. If step 120 is performed on the basis of empirical data, data for several different possible transfer functions may have been previously stored in memory 60 in association with compensation settings that are appropriate for counteracting the attenuation characteristics of each transfer function. In step 120 processor 50 finds the stored empirical data set that best matches the data collected from the performance of steps 110-116, and the processor retrieves from memory the compensation settings stored in association with that empirical data set. In step 122 processor implements those compensation settings. For example, in step 120 processor 50 may look for the empirical data set having approximately the same roll-off characteristics at a desired data rate. The associated compensation settings that are retrieved from memory 60 as part of step 120 and then implemented in step 122 may include one or more of the following: (1) a pre-emphasis setting for control 22, (2) an equalization setting for equalizer 44, and/or (3) a Vod setting for control 22. The presently most preferred embodiments use at least control of equalizer 44 (item 2 in the preceding sentence). Heavy reliance on pre-emphasis (item 1 above) may have the disadvantage of increasing crosstalk between adjacent communication channels like 30. High Vod (item 3 above) may have a similar disadvantage, and also tends to increase power consumption.

As an alternative to reliance on empirical data, processor 50 may perform step 120 by performing one or more calculations. As just one example of such possible calculations, processor 50 may calculate a setting for the first post tap of pre-emphasis (in control 22) and/or equalization (in equalizer 44) by trying to compensate for the amount of attenuation measured in FIG. 5. Processor 50 can calculate the setting(s) needed to best compensate the attenuation measured in FIG. 5. Again, the presently most preferred embodiments use at least control of equalizer 44, because heavy reliance on pre-emphasis may have the disadvantage of increasing crosstalk between adjacent channels 30.

After step 122 has been performed, and assuming that optional steps 130 (described later) are not performed, transmission of actual data can begin as shown by step 140.

One or more of several optional steps 130 may be performed between steps 122 and 140. These optional steps may be for such purposes as further refining the compensation settings initially implemented in step 122 and/or testing to make sure that data is being received with satisfactory reliability.

Figure 6A:
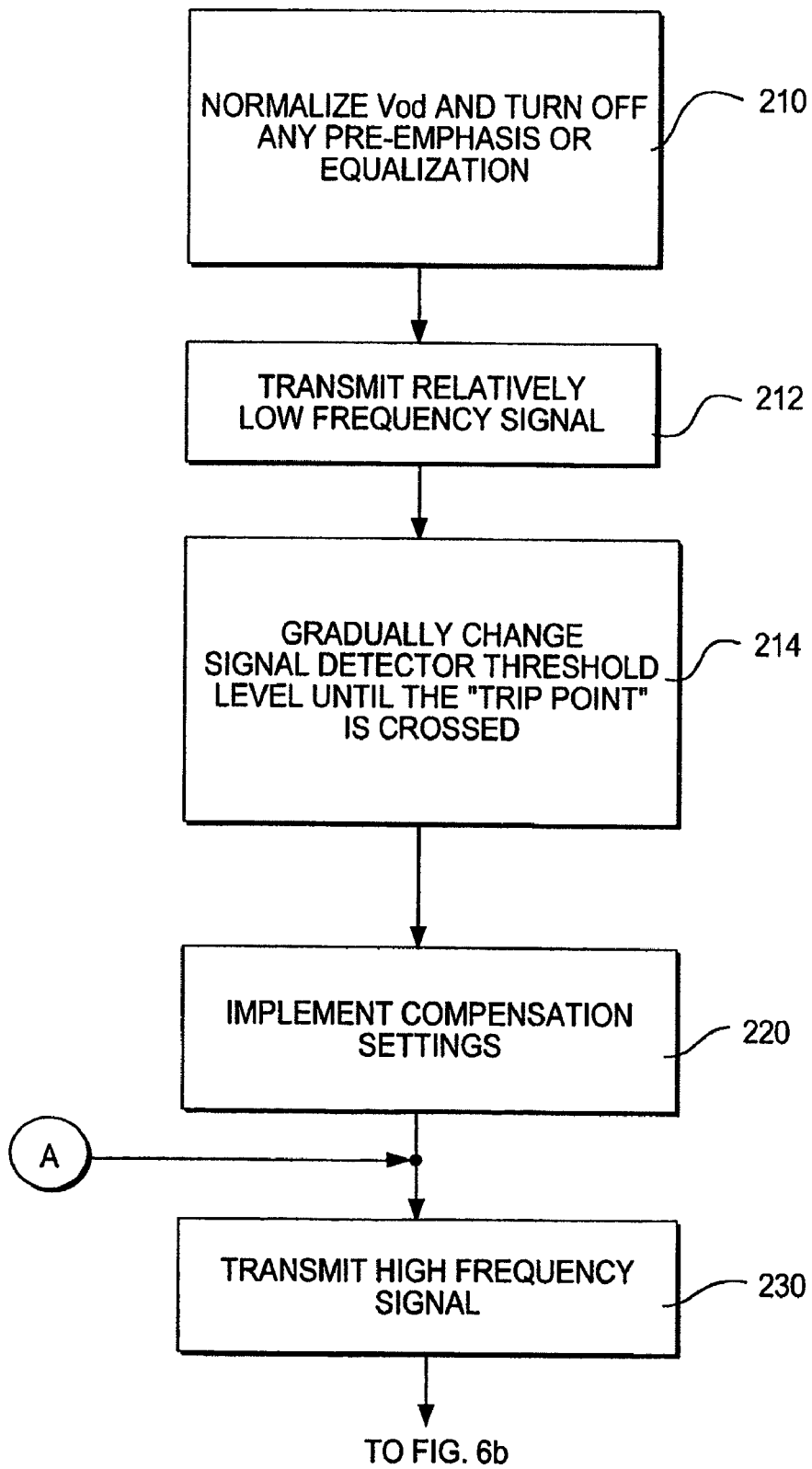
FIGS. 6a and 6b are collectively a simplified flow chart of possible further illustrative operations in accordance with the invention.
Figure 6B:
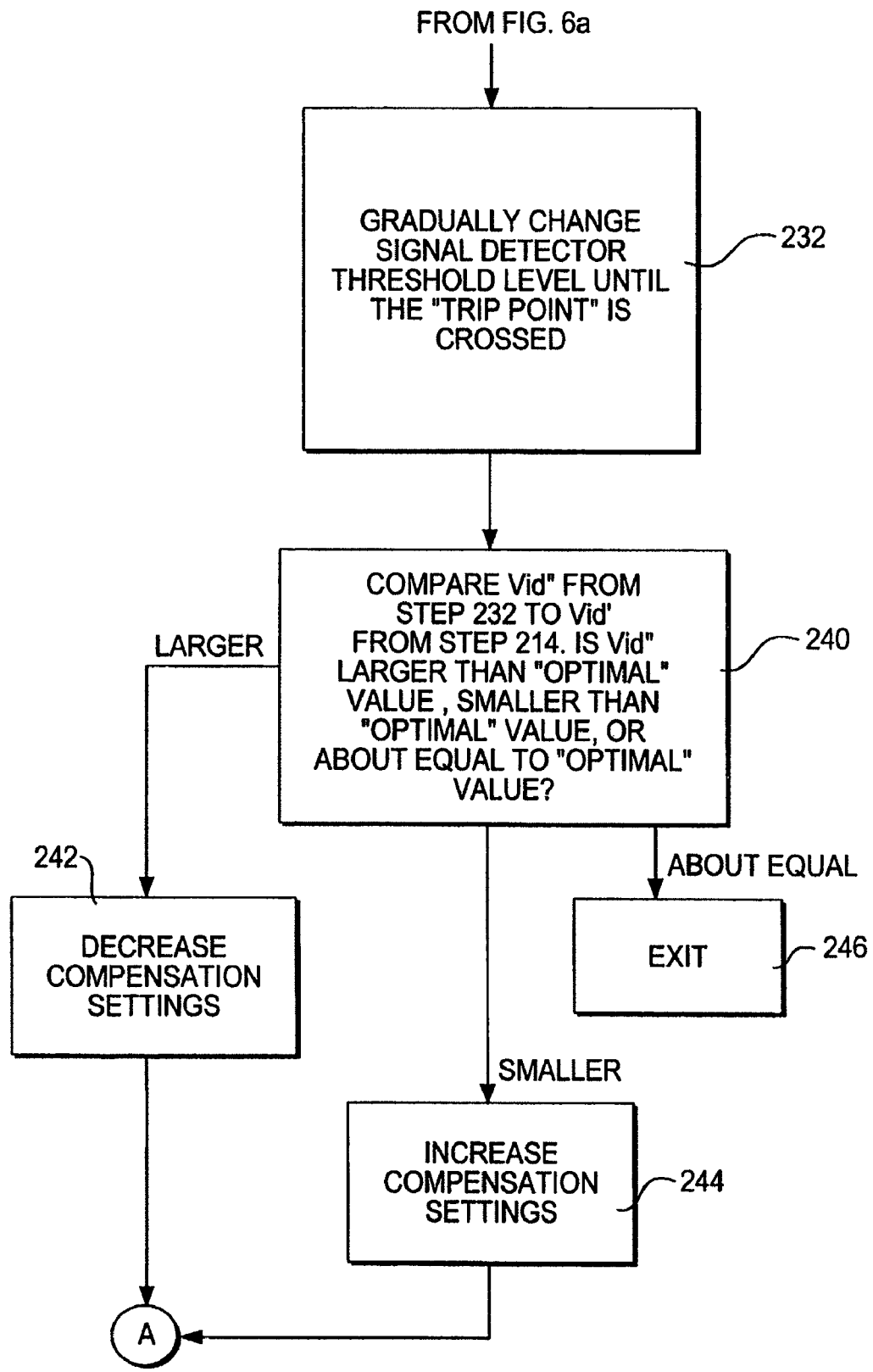

An illustrative step 130 for possibly refining compensation settings initially implemented in step 122 is shown in more detail in FIGS. 6a and 6b. In step 210 any initial compensation settings that have been implemented in step 122 are turned off by processor 50. In step 212 processor 50 causes control 22 to transmit a relatively low frequency signal (e.g., a 32 MHz signal as shown in the second column of FIG. 7). In step 214 processor 50 causes the threshold level of peak detector 46 to change gradually until it is possible to discriminate between the highest threshold value that allows a high level in the output signal of equalizer 44 to pass and the lowest threshold value that does not allow such a high level to pass. In the particular example illustrated by the first two columns in FIG. 7, with Vod set at 800 mV, the highest Vid that allows a data high from equalizer 44 to pass should be 800 mV (this is the highest Y in the second column in FIG. 7). The lowest Vid that does not allow a data high from equalizer 44 to pass is 900 mV (this is the lowest N in the second column in FIG. 7). A relatively low frequency signal (e.g., 32 MHz) is used for this series of steps because attenuation should be relatively small at low frequencies.

Figure 7:
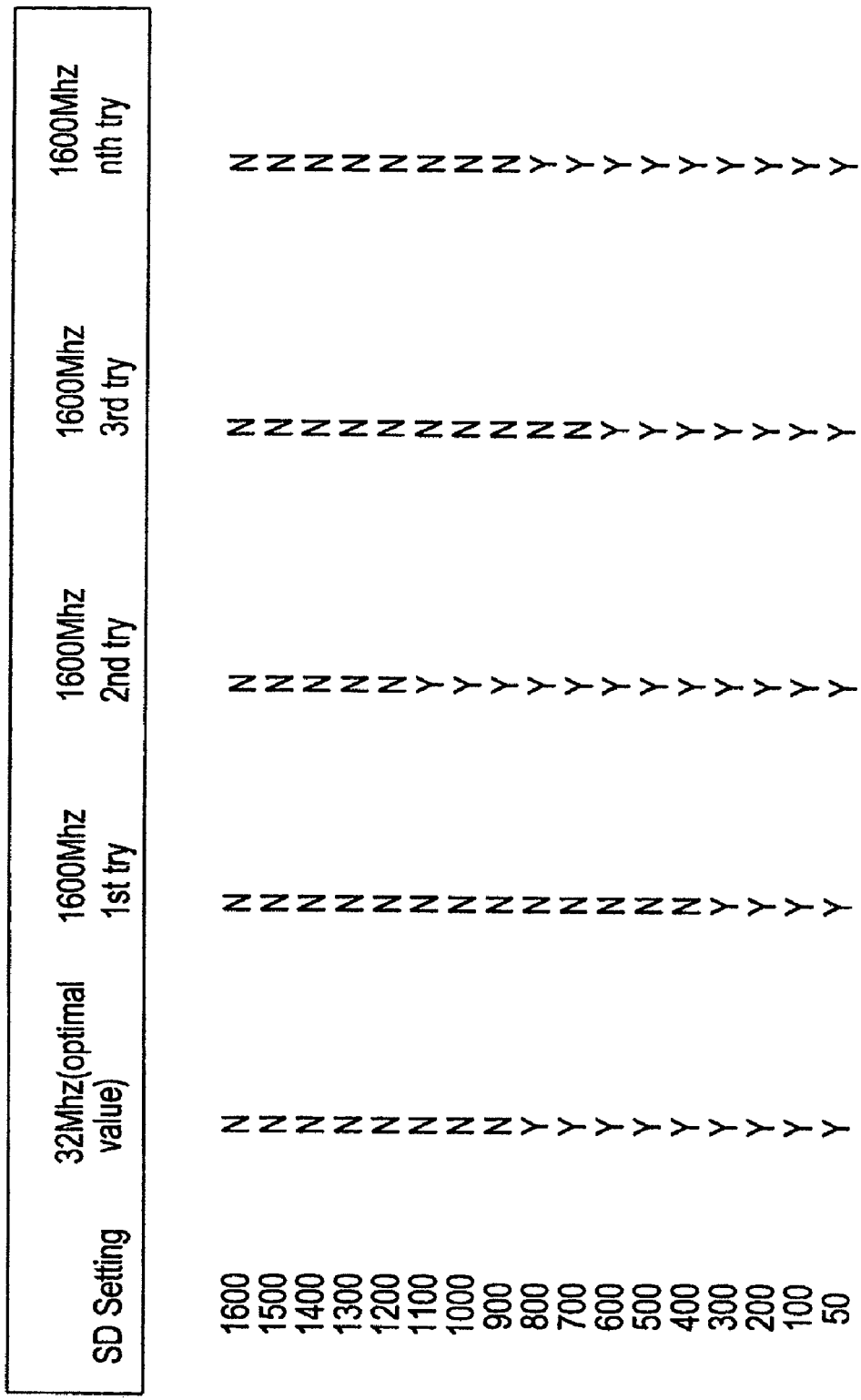
FIG. 7 is another table showing further illustrative information about system performance that may be collected in accordance with the invention.

It may not be necessary to perform steps 210-214 if data like that shown in the second column of FIG. 7 is available from performance of steps 112-116 with a suitably low frequency signal.

Continuing with FIG. 6a, in step 220 the compensation settings determined in step 120 are implemented by processor 50. Then in step 230 processor 50 causes elements 22 and 24 to transmit a high frequency (e.g., a 1600 MHz signal as in the third column of FIG. 7). Step 232 is like step 214, but for the high frequency signal. In step 240 processor 50 compares the "trip point" (transition from Y to N) in the third column in FIG. 7 to the "trip point" in the second column in FIG. 7. If the high frequency trip point is higher than the low frequency trip point, step 242 is performed by processor 50 to somewhat decrease the compensation implemented. Control then returns to step 230 for another pass from that step onward. If in step 240 the high frequency trip point is lower than the low frequency trip point, then step 244 is performed by processor 50 to somewhat increase the compensation implemented. Control then returns to step 230 for another pass from that step onward. If in step 240 the high frequency trip point is about equal to the low frequency trip point, then convergence has been reached and step 246 is performed to exit from this sequence of steps.

The four right-hand columns in FIG. 7 show data from four illustrative passes through steps 230 et seq. in FIGS. 6a and 6b. In the third from left column the compensation is initially too little (because the transition from Y to N in the third from left column is lower than the transition from Y to N in the second from left column). The initial compensation is accordingly increased. However, the fourth from left column in FIG. 7 shows that the increase has been too great (because now the transition from Y to N is higher than in the second from left column). The compensation is therefore lowered somewhat. Again, however, it is found that the compensation is too low (because the transition from Y to N in the fifth from left column is lower than in the second from left column). The compensation is therefore increased again. In this way compensation settings are eventually reached (as in the right-most column in FIG. 7) that make the Y to N transition for the high frequency signal approximately equal to that for the low frequency signal.

Figure 9:
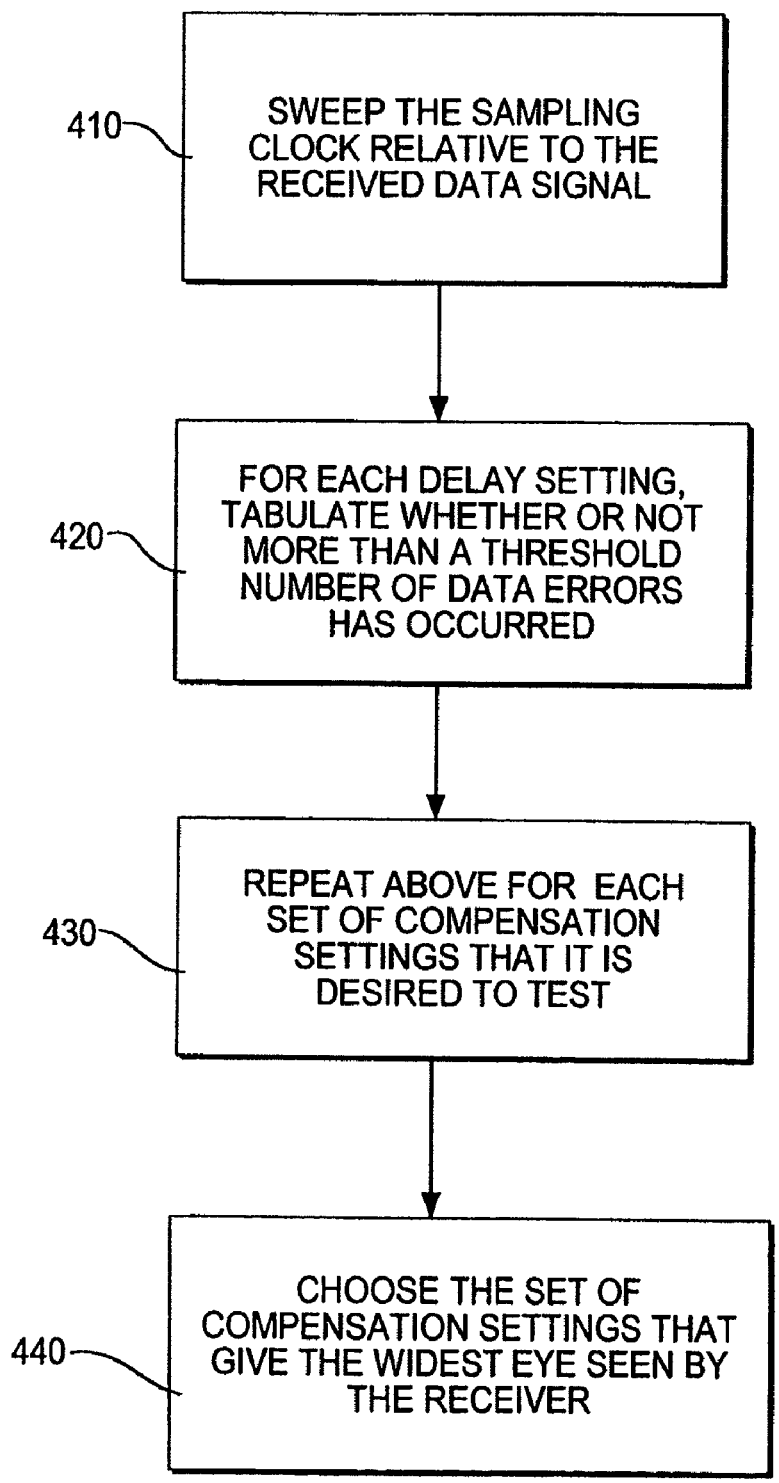
FIG. 9 is another simplified flow chart of still further possible operations in accordance with the invention.

The degree of precision that can be achieved in accordance with FIGS. 6a, 6b, and 7 may depend to some extent on how closely spaced the available signal detector thresholds are (left-hand column in FIG. 9). More closely spaced signal detector thresholds should increase achievable precision.

Another example of an optional step 130 (FIG. 4b) that can be used to refine compensation settings in accordance with the invention is to test the width of the data eye in a compensated data signal. The data eye is the time between the most closely spaced transitions in a data signal. If the received data eye becomes too small (as compared to what it was at the transmitter), errors may occur in interpreting the received data because it may become difficult or impossible to always sample the received data at points that are sufficiently spaced from transitions to avoid erroneous sampling results.

Illustrative capability that may be included in PLD 40 to determine the width of the data eye is shown in FIG. 8. In addition to elements already shown in FIG. 1 and described above, FIG. 8 shows slicer circuitry 310 for sampling the output signals 48 of equalizer 44 at times determined by a clock-type output signal of clock-type circuitry 320. The phase of the output signal of circuitry 320 is controllable by processor 50. During operation of the components shown in FIG. 8, known test data is transmitted by transmitter 20 (FIG. 1) to receiver 40 via transmission medium 30. Transmitter 20 may be controlled to do this by processor 50 sending appropriate control signals to control 22 via communication link 70. Although the known test data may have any of a number characteristics, one desirable characteristic that it may have is the appearance of randomness (although it is in fact fully specified and therefore known prior to transmission). An exact replica of the known test data may be stored in memory 60 as shown in FIG. 8.

As transmitter 20 transmits the test data, slicer 310 attempts to recover it using a clock signal phase from circuitry 320 determined by processor 50. Comparator circuitry 330 compares the serial data signal 312 output by slicer 310 to the replica of the test data concurrently and synchronously output by memory 60. Any bits that comparator 330 receives that do not match one another indicate that slicer 310 is not sampling the received data signal at the time required to correctly capture a bit in that signal. Processor 50 periodically changes the phase employed by circuitry 320 in small increments. Accordingly, after enough of these incremental changes to the phase of circuitry 320 have been made, the sampling time of slicer 310 will have been effectively swept across the received data eye. The number of phase increments for which data capture remains error-free (or substantially error-free) is a measure of the width of the received data eye. If processor 50 finds that the received data eye is too narrow (e.g., as compared to the known data eye at transmitter 20), processor 50 can adjust the compensation settings (e.g., from step 122 in FIG. 4b) to widen the received data eye.

Illustrative steps for using capability of the type shown in FIG. 8 are shown in FIG. 9. Step 410 describes using different phases output by circuitry 320 in FIG. 8 to sample the received data at different times. (An alternative would be to introduce different amounts of delay into the received data signal going into slicer circuitry 310.) Step 420 describes detecting whether or not each phase used in step 410 gives more than a threshold number of data errors. (An alternative to "on the fly" comparison between two serial signals (as in comparator 330 in FIG. 8) would be to accumulate the received serial data output by slicer 310 in another part of memory 60 and then later compare that received data to the expected data.)

If a first performance of steps 410 and 420 does not indicate that the received data signal has an eye of acceptable width, then step 430 is performed to repeat steps 410 and 420 with another set of compensation settings that it may be desired to test. Step 430 can be repeated as many times as desired. Then step 440 is performed to pick the compensation settings that gave the best results from the various performances of step 430.

From the foregoing it will be seen that FIG. 9 is another illustrative embodiment of what is described as optional step(s) 130 in FIG. 4b. FIG. 8 is an illustrative embodiment of circuit capability for carrying out the FIG. 9 steps. The various embodiments of optional step(s) 130 in FIG. 4b shown and described herein can be used individually or in any combination, or omitted entirely, as desired.

Figure 10:
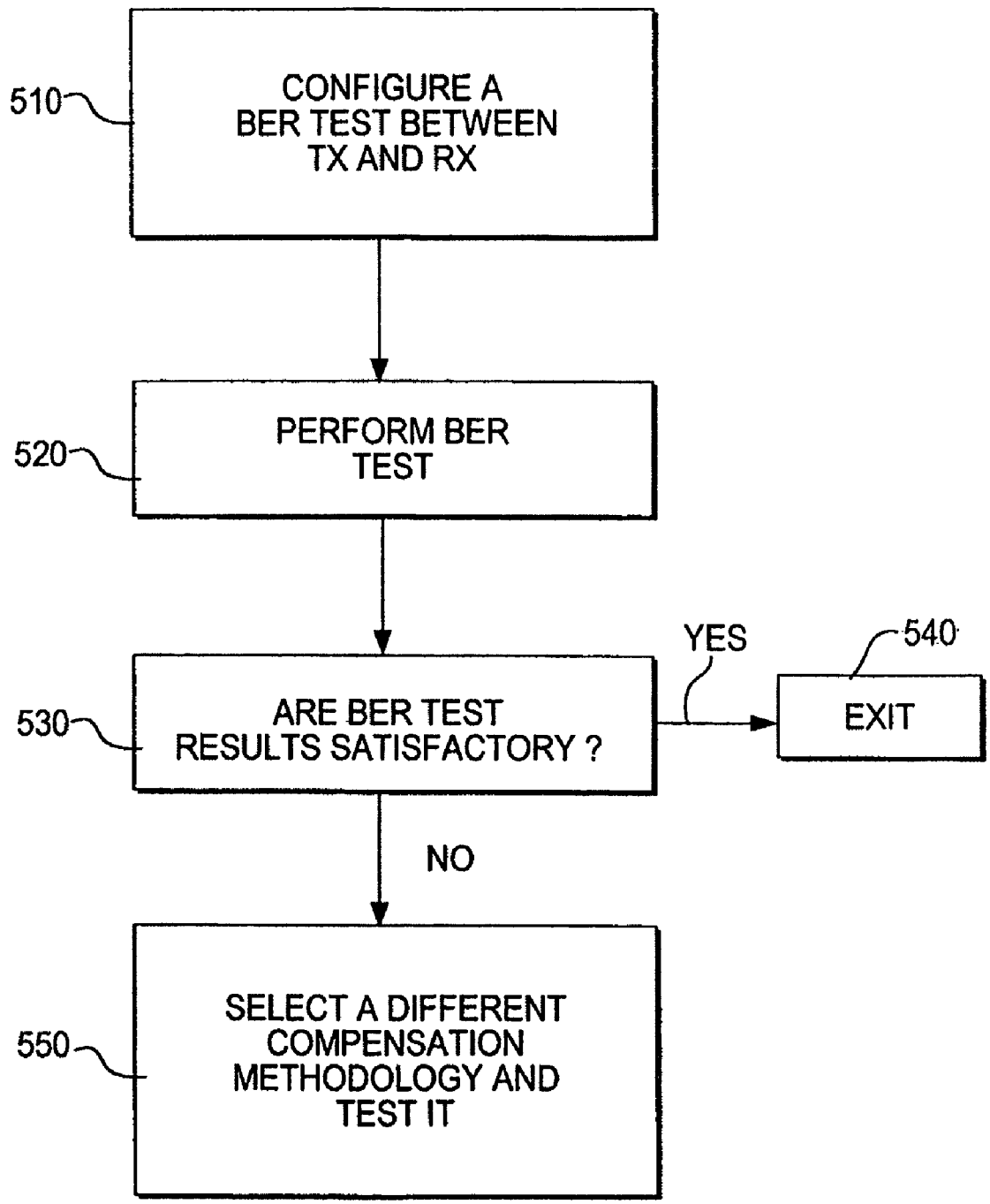
FIG. 10 is yet another simplified flow chart of still more possible operations in accordance with the invention.

Still another example of an optional step 130 (FIG. 4b) in accordance with the invention is to test whether the bit error rate ("BER") is acceptable. This may be done, for example, as shown in FIG. 10. In step 510 processor 50 (FIG. 1) sets up a bit error rate test between transmitter 20 and receiver 40. For example, processor 50 may select such parameters as the bit error rate that is acceptable (e.g., no more than 1 error in $10^{12}$ bits), the test data to be used, the time duration of the test, etc. In step 520 processor 50 may initiate the BER test (e.g., by commanding control 22 to begin to send the BER test data). Also in step 520 processor 50 may keep track of the results as the test proceeds. For example, processor 50 may use an arrangement of capabilities like those represented by elements 60 and 330 in FIG. 8 to compare received serial data to the expected data output by memory 60 and to keep track of any discrepancies (errors) detected by that comparison.

At the conclusion of the BER test, step 530 is performed to determine whether the test results were satisfactory (i.e., whether or not the bit error rate was acceptably low). If so, control passes to step 540 to exit from this series of steps without need for any change in previously established compensation settings. If not, step 550 may be performed to try some further adjustment to the compensation settings. For example, if the optional steps illustrated by FIGS. 8 and 9 were not previously employed, then step 550 could cause those steps to now be tried. As another example, if step 120 (FIG. 4b) was first performed using calculations, then step 120 might be performed again based on empirical data (followed by re-performance of the steps following step 120).

It will be understood that the foregoing is only illustrative of the principles of the invention, and that various modifications can be made by those skilled in the art without departing from the scope and spirit of the invention. For example, although processor 50 is shown in receiver PLD 40, some or all of that component could instead be in transmitter PLD 20, with communication via link 70 being bi-directional or reversed from the direction shown in FIG. 1. By using programmable (configurable) components such as PLDs 20 and 40, any of a wide range of different compensation algorithms can be implemented. Moreover, the particular parameter values used in these parameters can also be varied. Similarly, the particular signal handling that is performed to effect desired compensation can vary over a wide range. Some examples of things can be done to effect compensation are the various aspects of equalization control that are shown and described in Wong et al. U.S. patent application Ser. No. 10/762,864, filed Jan. 21, 2004).

The invention claimed is:

1. A method of compensating for loss in a transmitted data signal at a receiver, the method comprising:
   measuring amplitude of each of a plurality of transmitted test signals having respective different frequencies;
   storing, for each of the plurality of transmitted test signals, a value associated with the test signal frequency indicative of a predetermined threshold and whether the measured amplitude of the test signal is less than the predetermined threshold, wherein unacceptable loss is identified based on the measured amplitude of the test signal;
   analyzing the value stored for each of the plurality of transmitted test signals to identify a frequency corresponding to the test signal value where the predetermined threshold indicated by the test signal value is smaller than the predetermined threshold indicated by another test signal value; and
   when the frequency is identified:
      generating a transfer function based on the value stored for each of the plurality of test signals; and
      determining compensation for the receiver based on the generated transfer function that would have at least partly reduced the unacceptable loss.

2. The method of claim 1 further comprising adjusting the predetermined threshold until the measured amplitude is less than the predetermined threshold.

3. The method of claim 1, wherein the amplitude and value of a first of the signals is measured and stored before the amplitude and value of a second of the signals is measured and stored.

4. The method of claim 1, wherein the value further indicates whether the measured amplitude is greater than the predetermined threshold.

5. The method of claim 1 further comprising receiving the plurality of transmitted test signals at the receiver in succession having known amplitudes and respective different frequencies.

6. The method of claim 5 wherein the amplitudes are measured as the signals are received by the receiver and the values are stored in a memory of the receiver.

7. The method of claim 1, wherein the transfer function is generated after the amplitude of each of the plurality of test signals is measured.

8. The method of claim 1 further comprising comparing information associated with the transfer function to information associated with each of a plurality of reference transfer functions to identify at least one similar reference transfer function.

9. The method of claim 1 further comprising:
   implementing the compensation determined based on the generated transfer function;
   receiving a further transmitted test signal;
   thereafter, measuring amplitude of the further transmitted test signal; and
   determining whether the further transmitted test signal as received by the receiver is under-compensated, over-compensated, or properly compensated.

10. The method of claim 9, wherein when the further test signal is under-compensated, increasing the compensation implemented in the implementing.

11. The method of claim 9, wherein when the further test signal is over-compensated, decreasing the compensation implemented in the implementing.

12. The method of claim 1 further comprising transmitting a control signal that causes a transmitter of the test signals to transmit an additional test signal with a different frequency than the frequency of previously transmitted test signals.

13. A method of compensating for loss in a transmitted data signal, the method comprising:
   transmitting to a receiver a first test signal having a known amplitude and first frequency;
   receiving a control signal from the receiver when the receiver measures and stores a first value for the first test signal;
   in response to receiving the control signal, transmitting a second test signal having the known amplitude and a different second frequency; and
   receiving the control signal from the receiver when the receiver measures and stores a second value for the second test signal, wherein:
      the first and second values stored in the receiver are associated with the respective first and second test signals and are indicative of a predetermined threshold and whether the measured amplitude of the respective test signal is less than the predetermined threshold, wherein unacceptable loss is identified based on the measured amplitudes of the test signals;
      the first and second values stored in the receiver are analyzed to identify a frequency corresponding to the test signal value where the predetermined threshold indicated by the test signal value is smaller than the predetermined threshold indicated by another test signal value;
      a transfer function is generated based on the values stored for the first and second test signals; and
      compensation is determined based on the generated transfer function that would have at least partly reduced the unacceptable loss.

* * * * *